United States Patent Office 2,894,155
Patented July 7, 1959

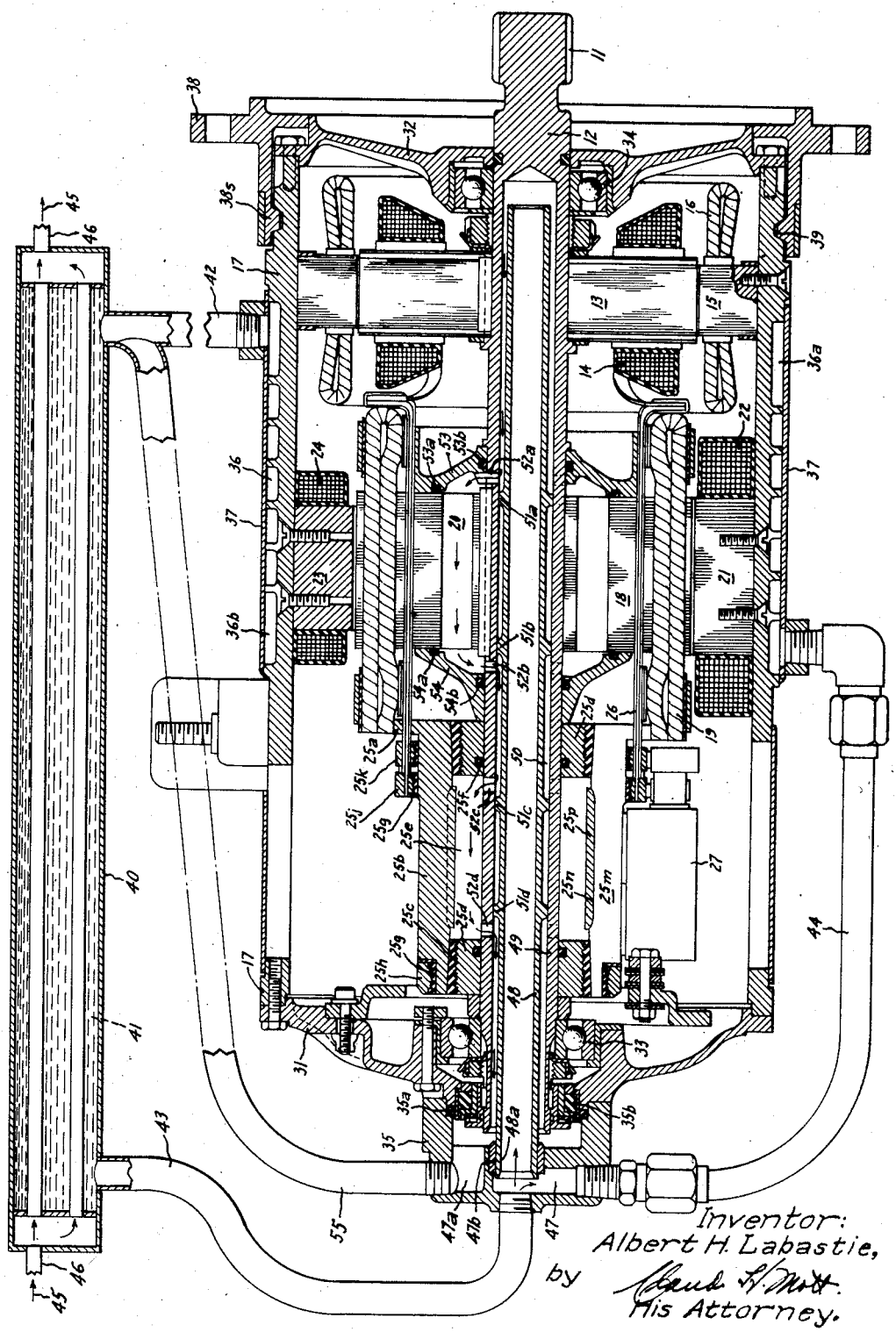

2,894,155

LIQUID COOLED DYNAMOELECTRIC MACHINE

Albert H. Labastie, Medford, Mass., assignor to General Electric Company, a corporation of New York Application March 21, 1955, Serial No. 495,643

4 Claims. (Cl. 310—54)

This application relates to dynamoelectric machines and has particular significance in connection with improved arrangements for more efficiently cooling such machines, particularly when used as generators in high flying aircraft.

Heretofore, electric systems of airplanes adapted for high altitude operation have presented vexatious problems because the high speed of aircraft in the lower air densities existing at high altitudes raises the temperature of the ram air so high that it is not useful for the effective cooling of high capacity dynamoelectric machines. Heating is not so serious in the case of most electric motors used in aircraft because they operate only intermittently, but is a considerable problem in connection with the principal generator of the system since it must operate continually and usually under load conditions.

In Patent 2,606,946, issued August 12, 1952, on an application filed by Alec Fisher and assigned to the assignee of the present invention, the use of a suitable liquid coolant circulated through the interior of the machine and an external intercooler with means provided to pump out a major portion of the fluid adjacent commutator and brushes was disclosed, and while this is satisfactory in many applications, the turbulence as well as the increased "windage" losses make it less satisfactory in other applications.

It is an object of the present invention to provide simple and inexpensive means for overcoming the above-mentioned difficulties.

A further object is to provide a dynamoelectric machine cooling arrangement characterized by low losses.

Another object is to provide for a two unit (e.g., A.C.—D.C.) dynamoelectric machine an improved construction affording optimum cooling and insulation and other mechanical and electrical characteristics with minimum space requirements.

Other objects and advantages will become apparent and the invention will be better understood from consideration of the following description taken in connection with the accompanying drawing, in which:

The single figure is an elevational view in section and showing a two unit generator constructed in accordance with the invention.

In accordance with the illustrated embodiment of this invention an aircraft generator is provided with means for liquid cooling the rotor and the stator. A cooling liquid, such as oil, passes through a heat exchanger and into the end cap of the generator end shield and thereafter follows two parallel paths through the generator. One of the paths passes through a jacket surrounding the stator for cooling the stator. A unique dual shaft construction provides the other parallel path for cooling the rotor. From the end cap the rotor coolant passes through the bore of the inner shaft to the opposite end of the generator whereupon it reverses direction and flows in the annular space between the inner and outer shafts into cooling compartments in the rotor punchings and under the commutator to a second chamber of the end cap for return to the heat exchanger. None of the liquid enters the cavity where the windings are located. The dual shaft is formed of a hollow outer shaft and a hollow inner shaft positioned in the bore of the outer shaft to rotate therewith. The inner shaft is provided with a plurality of axially spaced annular rings on its outer surface and is pressed into the bore of the outer shaft so that the annular rings serve as dams preventing the cooling liquid from flowing axially in the annular space between the inner and outer shafts from one end to the other. The outer shaft is provided with openings in its walls to provide a flow path for the liquid passing between the shafts bypassing the dams and passing through cooling chambers for cooling the rotor and the commutator. The liquid in the bore of the inner shaft and the returning liquid in the annular space between the shafts are in good heat exchange relationship to provide more nearly uniform cooling of the rotor. In this arrangement the rotor cooling liquid enters and emerges from the machine at a single point.

Referring now to the drawing, there is shown a two unit aircraft generator adapted to provide direct current power and alternating current power, to provide for needs of the other electrical equipment on an aircraft. The generator is adapted to be driven as by an aircraft engine (not shown) driving a splined end 11 of double-walled hollow shaft 12 hereinafter more fully described. For the A.C. unit, shaft 12 drives a laminated rotor core 13 provided with a wound rotor type winding 14 and arranged to react electrodynamically with a laminated stator core 15 having a distributed type winding 16. The A.C. and D.C. units are mounted on the shaft 12 and utilize a common frame 17 having solid end flanges 31 and 32 for mounting bearings 33 and 34, respectively, for supporting shaft 12.

While forming no part of the present invention, means are of course provided for mounting the generator frame 17 upon the aircraft engine for which it is an accessory, for example, by a bolt receiving engine engaging flange 38 having a split ring portion 38s adapted to be compressed to engage a V-shaped groove 39 formed in the adjacent end of frame 17. Such a construction is more fully disclosed and claimed in U.S. Patent 2,645,438, issued on an application filed by Irving Kalikow, and assigned to the same assignee as the present invention.

The D.C. unit shaft 12 drives a laminated rotor core 18 provided with an armature winding 19 and rotor core cooling chamber 20 which may be axially extending (as shown for simplicity) but preferably for the hotter (usually higher rated) units the passages are spiralled for greater length of coolant path through the core. Additionally, the passages could be provided with spaced fins to increase the heat transfer surface of the passage. The rotor core 18 is arranged to react electrodynamically with a stator core comprising laminated field poles 21 joined by an outer yoke which may be a portion of the frame 17. Field excitation is supplied by field windings 22 on poles 21, and solid commutating poles 23 with windings 24 are interspersed between the field poles in conventional manner. The armature winding 19 is connected at tapped intervals through ears 25a to the individual commutator segments 25b mounted on rings 25c of insulating compound, for example, a composition of ground glass and mica. Rings 25c, in turn, are mounted on metal support cones 25d which are keyed to be driven by the shaft 12 while axially spaced from each other to provide an annular chamber 25e between segments and shaft. Preferably O rings 25f, which may be of synthetic rubber or of metal, are used in the commutator cones to prevent leakage from the chamber 25e along the shaft. Additional rings of insulation 25g surround the reduced diameter outer ends of the segments, and at this outer end this insulation is held in place by metallic shrink ring 25h. The inner diameter of the commutator may be constructed with the usual mica 25m between segments cut back as at 25n so that copper fins 25p are provided to increase contact area to the cooling medium in the chamber 25e. It is readily apparent that this shrink ring commutator construction shown provides an enlarged cooling surface for the transfer of heat to a liquid in chamber 25e.

On the riser end, the commutator shrink rings 25j and 25k hold adjacent insulation 25g and also act as slip rings for the A.C. unit, insulated leads 26 from the A.C. rotor winding 14 being brought through the D.C. rotor core 18 for attachment to these rings (25j and 25k) with the advantage that the A.C. and D.C. brushes can be located in common brush holders 27 so as to take up minimum space and for easy maintenance and inspection.

The entire rotor is arranged to be liquid-tight and to this end commutator end flange 31 is provided with an end cap 35 which is sealed with end flange 31 by seal ring 35a and is sealed with shaft 12 by seal ring 35b which provides a running seal.

In order to cool the machine, an outer jacket is formed surrounding the frame 17. As shown, the jacket is formed by a continuous spiral groove 36 provided in the frame 17 and covered by a welded plate 37. The width of the groove is enlarged at its ends 36a and 36b to provide an entrance and exit for spiral groove 36 and to mate with feed conduits.

The generator is designed to operate in connection with a heat exchanger 40 to which a liquid 41, such as oil, is conveyed from the stator jacket end groove 36a by a conduit 42 and by a conduit 43 leading from end cap 35.

The liquid is cooled in the intercooler by passing therethrough a separate liquid or gas schematically illustrated by arrows 45 as entering and leaving the intercooler by separate conduits 46. While at supersonic speeds ram air is not suitable for this intercooler cooling application, air blast means independent of vehicle speed may be provided, or other fluids may be used, for example, liquid fuel on its way to the aircraft prime mover engine may be passed through conduit 46.

From the conduit 43 the oil (or other cooling fluid 41) enters chamber 47 of end cap 35 from whence it enters conduit 44 to cool the stator. By a parallel path the oil also enters the end 48a of the inner shaft 48 of the dual shaft 12. End 48a of shaft 48 is in communication with chamber 47 through an aperture 47b in the wall thereof and is arranged to have a close running fit therewith. The outer hollow shaft 49 of the dual shaft 12 is provided with an inner bore which will accommodate inner shaft 48 throughout the entire length of commutator and rotor cores. The liquid traverses the entire length of the bore of the inner shaft 48 and the two part shaft construction is such that the inner shaft is provided with external rings 51a—51d which engage the inner surface of the outer shaft 49 at axially spaced points to provide dams preventing the liquid from continuing directly along the annular space 50 between shafts 48 and 49. The outer shaft 49 is provided with radial openings 52a—52d to provide communication between rotor cooling chamber 20 and commutator cooling chamber 25e and the annular space 50. By the placement of dams 51a and 51b with respect to openings or ports 52a and 52b, and dams 51c and 51d with respect to openings 52c and 52d, on shafts 48 and 49, respectively, in an easily manufactured dual shaft construction, there is provided a positive means for assuring that the liquid will enter chambers 20 and 25e as indicated by the arrows. The ends of the rotor core passages 20 are sealed off by rotor core end flanges 53 and 54, respectively, which serve as headers providing for the cooling liquid to flow over both ends of the punchings 18 for increased heat transfer surface as well as for delivering the liquid to the plurality of passages 20 through the rotor core. In order to prevent leakage between the laminations forming rotor core 18, a cement such as an insulating varnish is coated on each lamination prior to assembly of the core 18 under pressure to render the core leakproof. Rotor core end flanges 53 and 54 are sealed to the rotor core 18 and shaft 12 by seal rings 53a and 53b, and 54a and 54b, respectively, to prevent leaking into the stator cavity.

Thus the cooling fluid describes a counterflow pattern, that is, it goes through the inner hollow shaft from the commutator end to the flange end of the generator, then it reverses direction and cools the D.C. rotor punchings and the commutator by direct contact. It is important that the inflowing liquid in the shaft 48 and the reverse flowing liquid between shafts 48 and 49 are in direct heat exchange relationship through the thin wall of shaft 48 because this greatly lowers the average liquid temperature of the liquid passing into chambers 20 and 25e.

Bearings 33 and 34 are cooled by the transfer of heat to the cooling liquid through the wall of outer shaft 49. A separate (parallel) cooling path as already described conducts liquid to the jacket around the frame where the heat generated in the stator windings and cores is absorbed. If desired, a pressurized accumulator (not shown) and a coolant pump (not shown) may be used to keep the system full of liquid at all times and to regulate the amount of coolant passing through the machine.

From the foregoing, it is apparent that this invention provides a sealed rotor arrangement in which no liquid normally comes in contact with any of the windings so that the danger of electrical failures or large liquid "windage" losses are small. Further, this invention provides a unique dual shaft construction formed of two easily manufactured hollow shafts to positively direct the cooling liquid through the rotor. Moreover, this shaft construction assures the uniform cooling of all parts of the rotor by providing for heat exchange between the liquid entering and leaving the rotor and, in addition, greatly reduces leakage problems and the problem of supplying coolant to the rotor by utilizing a single point connection arrangement.

While there has been illustrated and described a particular embodiment, various modifications may obviously be made without departing from the true spirit and scope of the invention as defined in the appended claims.

What is claimed as new and desired to be secured by Letters Patent of the United States is:

1. A liquid cooled dynamoelectric machine having a frame providing an enclosed stator cavity, a stator in said cavity, a rotor member mounted for relative rotation on a shaft within said stator, said rotor member comprising a plurality of magnetic laminations sealed together to form a leakproof core provided with generally axial cooling ducts therethrough, a pair of end flanges sealing the exposed ends of said ducts in said core with said shaft, a commutator concentrically spaced from said shaft to form an annular cooling chamber therewith, means for sealing said commutator with respect to said shaft, said shaft comprising a dual shaft construction extending the length of said rotor and commutator and having a hollow inner shaft spaced from a concentric hollow outer shaft, ports in the outer shaft, axially spaced rings on the peripheral surface of said inner shaft in contact with the interior surface of the outer shaft, said rings and said ports being located along the length of said shafts to direct flow of coolant from the space between said concentric shafts first into the axial ducts in the rotor core and secondly in the chamber beneath said commutator to provide a counterflow coolant path wherein the incoming and outgoing coolant is in a heat exchange relationship.

2. A device as recited in claim 1, including an end cap for said dynamoelectric machine sealed with respect to said outer shaft and providing a pair of chambers communicating with the inner and outer shafts respectively to provide for the entry and exit of coolant from said rotor at a single point.

3. A liquid cooled dynamoelectric machine having a frame providing an enclosed stator cavity, a stator in said cavity, a rotor having its shaft mounted in bearings supported by the end bells of said stator frame, said rotor comprising a plurality of magnetic laminations joined together to form a leakproof core provided with generally axial cooling ducts therethrough, a pair of rotor end flanges sealing the ends of said ducts with said shaft, a commutator concentrically spaced from said shaft to form an annular cooling chamber therewith, means for sealing said commutator cooling chamber with respect to said shaft, said shaft comprising a hollow outer shaft having a bore extending to a position radially inwardly from each of the bearings, a hollow inner shaft having a bore providing for the entrance of coolant thereinto, said inner shaft extending the length of said rotor and terminating at a point adjacent a bearing remote from the coolant entrance, said inner shaft being positioned within the bore of said outer shaft and spaced therefrom to provide an annular coolant return path between said inner and outer shafts, axially spaced peripheral rings surrounding said inner shaft and in contact with the interior surface of the outer shaft forming dams for preventing the coolant to flow along said annular coolant path from one end to the other, and a plurality of ports in said outer shaft, said rings being located with respect to said ports to direct flow of coolant serially through said ducts, said return path, said commutator cooling chamber and again to said return path prior to passing in heat exchange relationship with the other bearing in said rotor.

4. In combination, a liquid cooled dynamoelectric machine comprising a stator frame enclosing a rotor arranged for electrodynamic cooperation therewith, a closed spiraled passageway in a frame for said stator for receiving a circulating coolant, said rotor comprising a pair of spaced concentric hollow shafts supporting a rotor core having ducts extending axially therethrough, means attached to said rotor core and the outer of said concentric shafts to provide communication between said ducts and ports formed in a wall of said outer shaft, a header connected with one end of said rotor and equipped with a pair of coolant supply and return chambers adapted for connection to a source of coolant supply, means respectively connecting said supply chamber with said inner shaft and said stator spiral passageway, and means respectively connecting the space between said concentric shafts and the discharge end of the stator spiral passageway with the return chamber, thereby permitting circulation of coolant in parallel paths to said stator and to the inner shaft wherein the coolant is adapted to flow through said ports and said ducts prior to being discharged to the return chamber through the space between said concentric shafts.

References Cited in the file of this patent

UNITED STATES PATENTS

| | | |
|---|---|---|
| 686,856 | Davies | Nov. 19, 1901 |
| 2,600,844 | Caputo | June 17, 1952 |
| 2,674,404 | Wieseman | Apr. 6, 1954 |

FOREIGN PATENTS

| | | |
|---|---|---|
| 16,979 | Great Britain | of 1914 |
| 24,751 | Great Britain | of 1907 |
| 48,052 | Sweden | Dec. 8, 1920 |
| 385,022 | France | Feb. 25, 1907 |
| 453,449 | France | Apr. 3, 1913 |
| 647,316 | Germany | July 1, 1937 |